United States Patent [19]

Buck

[11] 4,154,855

[45] May 15, 1979

[54] METHOD OF COOKING FOODS IN A MICROWAVE OVEN

[75] Inventor: Ronald G. Buck, Burnsville, Minn.

[73] Assignee: Litton Systems, Inc., Beverly Hills, Calif.

[21] Appl. No.: 829,078

[22] Filed: Aug. 30, 1977

[51] Int. Cl.² ............................................. A23L 1/00
[52] U.S. Cl. .................................... 426/243; 426/523
[58] Field of Search ............... 426/241, 243, 233, 523; 219/10.55 A, 10.55 B, 10.55 R

[56] References Cited

U.S. PATENT DOCUMENTS

| | | | |
|---|---|---|---|
| 3,467,804 | 9/1969 | Smith | 219/10.55 B |
| 3,839,616 | 10/1974 | Risman | 219/10.55 R |
| 4,080,564 | 3/1978 | Nitta et al. | 219/10.55 B |

OTHER PUBLICATIONS

Schmidt, A. X., "Material and Energy Balances", Prentice-Hall, Inc., N.J., 1962, pp. 61-65.

Primary Examiner—Robert A. Yoncoskie
Attorney, Agent, or Firm—Robert E. Lowe

[57] ABSTRACT

A method of cooking foods containing a substantial liquid component by sensing "in-situ" humidity and temperature environmental conditions of a microwave oven heating cavity. The method monitors the rate of change of the slope of the "characteristic humidity curve" to indicate the degree of cooking of the foods. By determining the rate of change of the slope of the "characteristic humidity curve", the value is indicative of the degree of the temperature level of microwave cooking of the foods and can be used to control microwave cooking of the foods.

4 Claims, 2 Drawing Figures

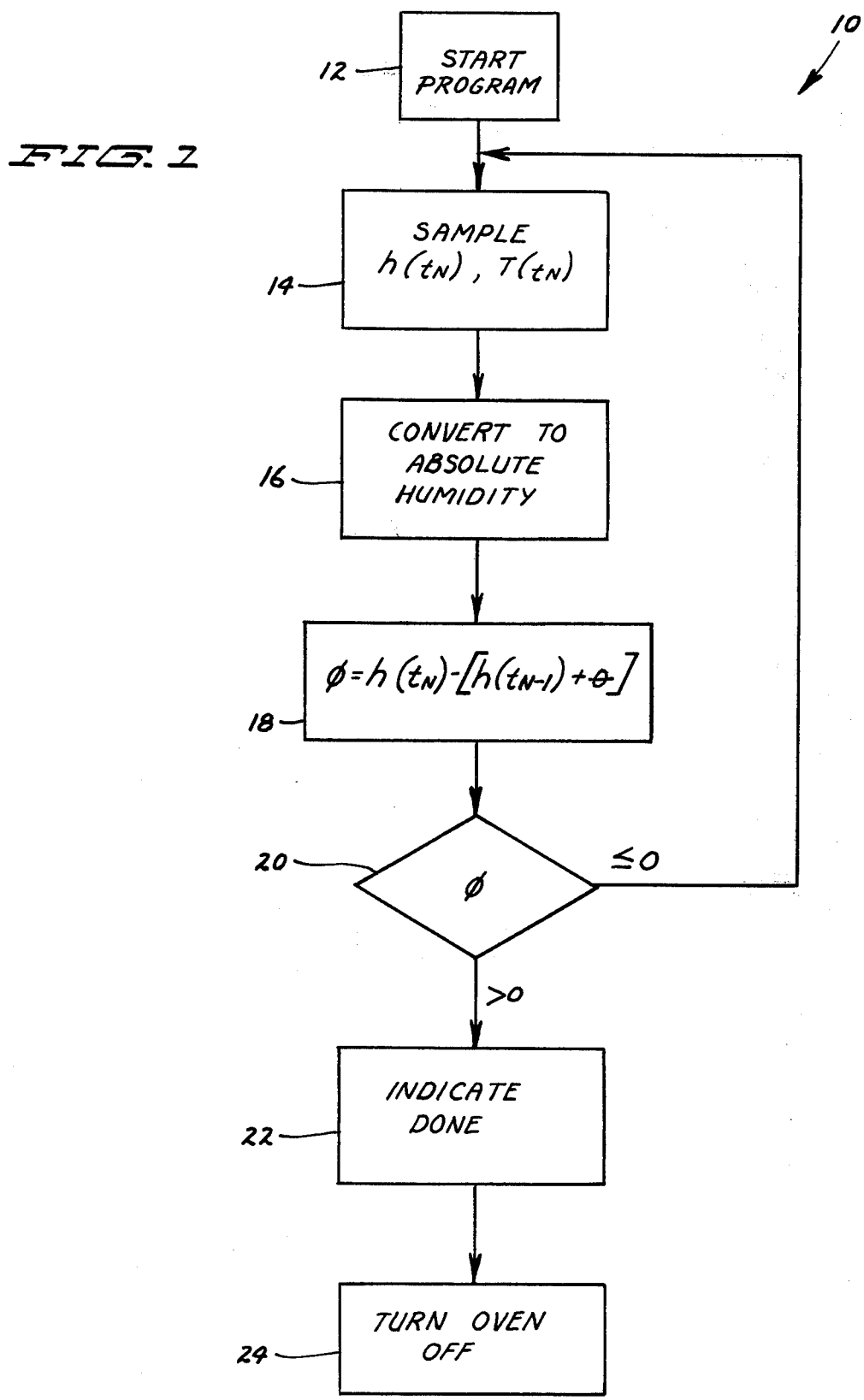

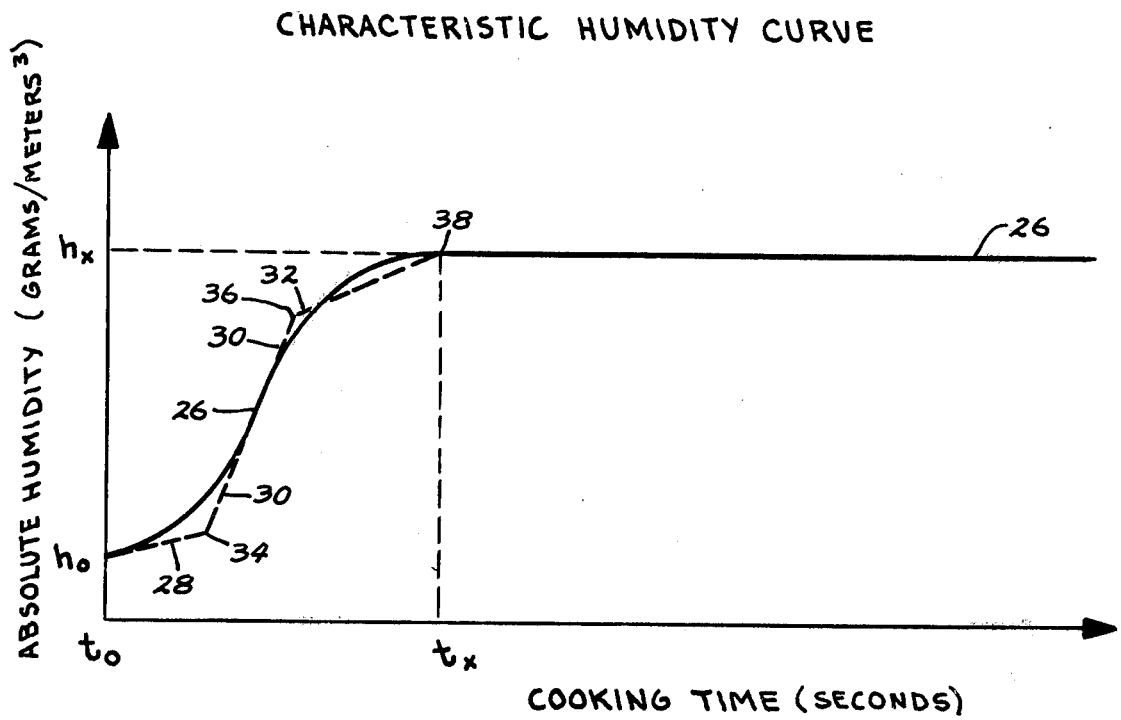

METHOD OF COOKING FOODS IN A MICROWAVE OVEN

BACKGROUND OF THE INVENTION

1. Field of the Invention

The present invention relates to improvements in microwave cooking, and more particularly, pertains to a new and improved method of cooking juiced foods in a microwave oven.

2. Description of the Prior Art

Those concerned with the development of microwave ovens have long recognized the need for a method of cooking juiced foods in a microwave oven. The present invention fills this need.

The prior art attempts of controlling the cooking of juiced foods in microwave ovens have been less than satisfactory. Juiced foods include canned foods such as vegetables or any food in a liquid such as sauces. The problem in microwave cooking of juiced foods in a microwave oven is that the juiced foods are usually brought to boil and continue to boil thereby causing the foods to lose taste, cooking the nutrients out of the food, and more than often, having juiced foods lose their consistency. It is recognized that to cook juiced foods in a microwave oven, the juice of the foods must not be able to come to boil; otherwise, the palatability of the juiced foods is lost in boiling. The prior art control systems have failed to sense the level of temperature of the juices in which the foods reside during microwave cooking in the microwave oven.

This invention, the method of cooking juiced foods in a microwave oven, overcomes the disadvantages of prior art by providing a method to maintain the temperature of the juiced foods within a desired temperature range through sensing of the time dependent "in-situ" humidity and temperature environmental conditions in the microwave oven heating cavity.

SUMMARY OF THE INVENTION

The present invention obviates the foregoing disadvantages of the prior art by providing a method of cooking juiced foods in a microwave oven.

According to the preferred embodiment of the present invention, there is provided a method for cooking juiced foods in a microwave oven heating cavity wherein the time dependent "in-situ" humidity and temperature environmental conditions are sensed, the relative humidity is converted into absolute humidity, the rate of change of the slope of the "characteristic humidity curve" is determined which indicates the portion of the "characteristic humidity curve" where the juiced food is being cooked, and controlling the microwave heating to maintain the cooking of the juiced foods at a predetermined point on the "characteristic humidity curve" corresponding to a temperature for microwave cooking of the juiced foods.

A significant aspect and feature of the present invention is maintaining the juiced foods at a constant temperature, but less than boiling to cook the foods within the juices to doneness.

Having briefly described the preferred embodiment of the present invention, it is a principal object to provide a new and improved method for cooking juiced foods in a microwave oven.

An object of the present invention is to sense the time dependent "in-situ" humidity and temperature environmental conditions of the microwave oven heating cavity to continually monitor the change of the slope of the "characteristic humidity curve" as the foods are being cooked which indicates the temperature of the juiced foods. The term "in-situ" as used in this application is defined as the actual time dependent environmental conditions which exist in the environment surrounding the food product which is located in and cooked in the microwave oven heating cavity. Although in the present invention, a humidity sensor and a temperature sensor may be positioned outside of the microwave oven heating cavity, the sensors are configured to sense the "in-situ" environmental conditions of the microwave oven heating cavity and provide "in-situ" signal information of the environmental conditions of the microwave oven heating cavity to a programmable controller controlling the microwave oven.

Another object of the invention is to provide for controlling the temperature of the cooking of juiced foods to maintain a desired temperature of the juice in which the foods reside while being cooked.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like elements throughout the figures thereof and wherein:

FIG. 1 illustrates a flow chart of the steps for the method of cooking juiced foods in a microwave oven in accordance with the present invention, and;

FIG. 2 illustrates a typical "characteristic humidity curve" for the present invention.

DESCRIPTION OF THE PREFERRED EMBODIMENT

FIG. 1 illustrates a flow chart 10 of the steps for the method of cooking juiced foods in accordance with the present invention showing a start program condition 12. The "in-situ" humidity at time N, shown as $h(t_N)$ and temperature at time N, shown as $T(t_N)$ 14 are sampled. The sampled humidity $h(t_N)$ at step 14 is converted to absolute humidity at step 16. Next, the factor $\phi$ is determined at step 18 by subtracting the absolute humidity at time N minus one, shown as $h(t_N-1)$ plus $\theta$, a constant in grams per cubic meter chosen to indicate at what point the proper degree of cooking of juiced foods has occured, from the absolute humidity 16 at time $t_N$. If $\phi$ greater than zero 20 condition exists, the algorithm indicates a cooking done condition 22 and the oven is turned off at step 24.

PREFERRED MODE OF OPERATION

The method of cooking juiced foods in a microwave oven can be implemented in accordance with the flow chart 10 of FIG. 1 as an algorithm stored in a programmable controller such as an Intel 8080 Microprocessor in the microwave oven. This algorithm determines when $\phi$ during microwave cooking in the microwave oven heating cavity is greater than zero to indicate doneness of juiced foods. $\phi$ is the rate of change of the slope of the "characteristic humidity curve" for the particular juiced food being cooked.

The "characteristic humidity curve" 26 of absolute humidity in grams per cubic meter versus cooking time in seconds of FIG. 2 is determined by sensing the time dependent "in-situ" humidity and temperature environmental conditions of the microwave oven heating cavity during microwave cooking of juiced foods. The time dependent "in-situ" environmental conditions are defined as the sensed humidity and temperature of the microwave oven heating cavity by humidity and temperature sensors. Each particular juiced food has its own particular "characteristic humidity curve". $h_o$ is the initial absolute humidity and $h_x$ is the peak absolute humidity at time $t_x$ of the "characteristic humidity curve" 26.

The "characteristic humidity curve" 26 of FIG. 2 can be approximated as a three segment 28, 30 and 32 piecewise linear curve prior to time $t_x$. The slope of the first segment 28 of the three segment piecewise linear curve is proportional to the rise in surface temperature of the food up to one hundred degrees centigrade. Once the hottest section of the surface has reached one hundred degrees centigrade which occurs at the change of slope 34, the humidity increases rapidly as illustrated by the slope of the second segment 30 of the three segment piecewise linear curve which is due to the "latent heat of vaporization" of the food. The change of slope 36 is indicative of the beginning of the surface temperature of the food reaching equilibrium. The slope of the third segment 32 of the three segment piecewise linear curve from points 36 to 38 is equilibrium beginning to occur at the surface temperature of the food. The "characteristic humidity curve" 26 plateaus at the point 38 indicating that surface temperature of the food has reached equilibrium at one hundred degrees centigrade.

Segment 28 of the three segment piecewise linear of the "characteristic humidity curve" 26 represents the portion where the juiced foods cook to a temperature degree of being very hot, but do not reach boiling at the surface of the juice. At the change of slope 34, the top surface temperature of the juice reaches equilibrium at one hundred degrees centigrade and begins boiling. At point 34, the rate of change of the slope of the "characteristic humidity curve" 26 begins rising rapidly indicating that the temperature of the juiced foods is changing from hot to boiling.

The basic premise of the method is to examine $\phi$ which is an indication of the rate of change of slope of the "characteristic humidity curve" for the juiced food being cooked. The rate of change of slope of relative humidity $h(t_N)$ can be examined instead of examining the rate of change of the absolute humidity 16 of the "characteristic humidity curve" of FIG. 2.

The greater $\phi$, the greater the rise in the slope of the "characteristic humidity curve" indicating an increased microwave heating effect of the juiced food. The constant $\theta$ is chosen for the $\phi$ equation of step 18 of the particular type of juiced food being cooked in the microwave oven heating cavity. An approximate value for the constant $\theta$ is 5 grams per cubic meter for way of example and purposes of illustration only.

An aluminum oxide humidity sensor, such as a Thunder Scientific TC-2000 Humidity Measurement Module, and a temperature sensor, such as a National Semiconductor Corporation LX 5700, are positioned adjacent to and by the exit ventilation port to the exterior side of the microwave oven heating cavity for way of example and purposes of illustration only to sense the time dependent "in-situ" environmental conditions and connect to the programmable controller to input the sampled and sensed values of humidity and temperature. The sensors are positioned to sense the time dependent "in-situ" environmental conditions of the microwave oven heating cavity and are electromagnetically isolated from the microwave oven heating cavity. The programmable controller connects to the microwave power source and to the air exchange control circuit to indicate done 22 and turn off the oven 24 when a $\phi$ greater than zero condition is satisfied.

The programmable controller according to the stored algorithm of steps 12-24 of FIG. 1 can be programmed to vary the microwave heating of the juiced foods to maintain $\phi$ within a desired range to control the microwave cooking of the juiced foods at a predetermined temperature in the microwave oven heating cavity. The programmable controller can be programmed to maintain the value of $\phi$ on the first segment 28 of the three segment piecewise linear curve for the "characteristic humidity curve" 26 for microwave cooking of juiced foods at a temperature below boiling over a predetermined time interval. Also, the programmable controller can be programmed to indicate done 22 and turn the oven off 24 when the $\phi$ greater than zero 20 condition is satisfied. Further, if the juiced foods are to be boiled for a predetermined time, then it is necessary to cook the foods in the second segment 30 of the three segment piecewise linear curve of the "characteristic humidity curve" 26.

By controlling the microwave power source control circuit and the air exchange circuit with the programmable controller, the rate of change of the slope $\phi$ of the "characteristic humidity curve" is controlled to maintain a predetermined temperature of the microwave cooking of the juiced foods. By controlling the value of $\phi$ through the steps of FIG. 1 and the programmable controller, it is possible to bring the surface of juiced foods to a predetermined temperature just under boiling for cooking the juiced foods or to boiling as desired in cooking the juiced foods.

Various modifications can be contemplated for the method of cooking juiced foods in a microwave oven of the present invention without departing from the apparent scope of the invention.

Having thus described the invention, there is claimed as new and desired to be secured by Letters Patent:

1. A method for cooking foods of the type containing a substantial liquid component in a microwave oven having an oven cooking cavity, a source of microwave energy, means for sensing the humidity in said cooking cavity, and a programmable controller, said method comprising the steps of:
   (a) applying microwave energy from said source to said food in said cooking cavity to heat said food;
   (b) measuring the humidity in said cooking cavity at a plurality of time-spaced intervals while said food is being heated and providing said measurements as an input to said programmable controller;
   (c) calculating in said programmable controller the rate of change of the slope of a humidity-time curve described by said measurements according to a program stored in said programmable controller; and,
   (d) discontinuing the application of microwave energy when said rate of change of said slope becomes greater than zero.

2. The method of claim 1 wherein said rate of change of said slope is determined by the equation:

$$\phi = h(tN) - [h(tN-1) + \theta]$$

wherein

φ is the rate of change of slope
h(tN) is the absolute humidity at time N
h(tN−1) is the absolute humidity at time N−1
θ is a predetermined constant.

3. The method of claim 1 wherein said humidity sensing means senses relative humidity in said cooking cavity and wherein said programmable controller converts said relative humidity to absolute humidity and wherein said absolute humidity is used to establish said humidity-time curve.

4. The method of claim 2 wherein said equation is stored in the memory of said programmable controller.

* * * * *